Figure 1:
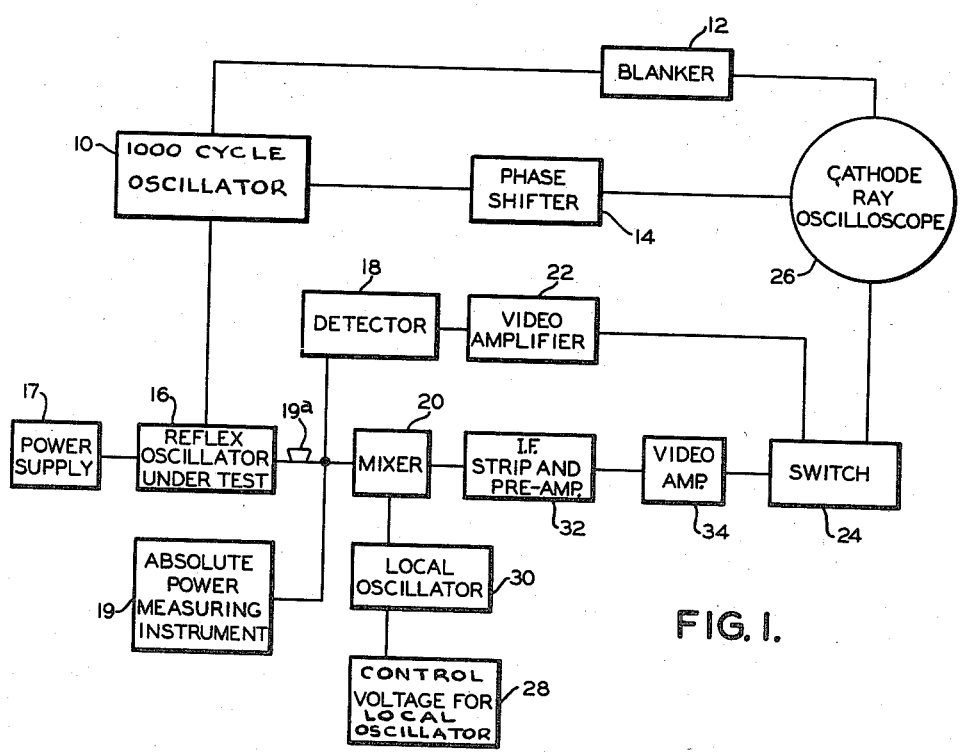

Oct. 26, 1954    J. B. GARRISON ET AL    2,692,974
VELOCITY-MODULATED OSCILLATION ANALYZER
Filed April 1, 1946

INVENTORS
JOHN B. GARRISON
CURTIS M. HEPPERLE

BY

ATTORNEY.

Patented Oct. 26, 1954

2,692,974

UNITED STATES PATENT OFFICE 2,692,974

VELOCITY-MODULATED OSCILLATOR ANALYZER

John B. Garrison, Cambridge, Mass., and Curtis M. Hepperle, Cedar Rapids, Iowa, assignors, by mesne assignments, to the United States of America as represented by the Secretary of the Navy Application April 1, 1946, Serial No. 658,592

4 Claims. (Cl. 324—158)

This invention pertains to electronic test gear at microwave frequencies and more particularly to such gear adapted to investigating the performance of velocity-modulated oscillators.

The prior art has included means for investigating the characteristics of such oscillators. Among the features it is desired to study are relative power outputs, frequency ranges for half-power output, and hysteresis effects within the oscillators. What is proposed here is a novel means of investigating these characteristics, means which present the results on the screen of a cathode ray oscilloscope from which they may readily be observed or photographed for permanent record.

It is an object of this invention to provide means for observing characteristic properties of velocity-modulated oscillators.

It is a further object of this invention to provide means for presenting characteristic properties of velocity-modulated oscillators, the presentation being graphic in nature and thus making possible a permanent photographic record.

Another object of this invention is to present on a cathode ray oscilloscope data on characteristic properties of velocity-modulated oscillators.

Still another object of this invention is to provide a system to present on a cathode ray oscilloscope data on relative power outputs, frequency range for half-power output, and hysteresis effects within a velocity-modulated oscillator.

To accomplish the foregoing general objects and other more specific objects which will hereinafter appear, our invention resides in the relation one to another of well-known conventional circuit elements such as may be found described in standard reference books like Terman's "Radio Engineers' Handbook," published by the McGraw-Hill Book Company, 1943, or "Principles of Radar" by the Staff of the Massachusetts Institute of Technology Radar School, declared unclassified November 8, 1945. The specification is accompanied by the drawing in which Fig. 1 is a block diagram of apparatus in preferred embodiment of this invention; and Fig. 2 is a typical presentation of the indication appearing upon the screen of the cathode ray oscilloscope constituting one element of this invention.

With particular reference to "Principles of Radar" cited above and Fig. 1 there is shown an oscillator 10 (as illustrated by Fig. 48, pages 2–55, "Principles of Radar") which provides a sinusoidally-varying voltage to a blanket 12 (as illustrated by Fig. 9, pages 2–11, "Principles of Radar"), to a phase shifter 14 (as illustrated by Fig. 57, pages 2–63, "Principles of Radar"), and to a reflex oscillator under test 16 (as illustrated by Fig. 45, pages 4–72, "Principles of Radar"). Reflex oscillator 16 has a power supply 17, shown schematically. (Power supplies for other units are not shown.) Oscillator 16 is equipped with an attenuator 19a (such as described on pages 980–984 in Terman's Handbook cited above) and an instrument 19 (such as discussed on pages 937–938 in Terman's handbook) for measuring absolute power output. This may incorporate a thermistor, or may be of any conventional type. Its function is to aid in a calibration, as will be explained later. The sinusoidally-varying voltage applied to the reflector of reflex oscillator 16 is of such magnitude as to cause the oscillator to operate over one mode (as disclosed in Fig. 47, pages 4–75, "Principles of Radar"). The output of power over that one mode is divided, one portion going to a detector 18 (as disclosed in Fig. 26, pages 13–51, "Principles of Radar"), the other to a mixer 20 (as disclosed in Fig. 41, pages 4–60, "Principles of Radar"). Crystal detectors and mixers are often suitable for this installation. That output which goes to detector 18 goes next to video amplifier 22 (as disclosed in Fig. 14, pages 4–27, "Principles of Radar"), to switch 24 and to cathode ray oscilloscope 26, in the order named. The final resultant effect is to produce the line A, representing power output, in Fig. 2. Concurrently a high frequency oscillator 28 supplies a sinusoidally-varying voltage to a local oscillator 30 which may also be of the reflex velocity modulated type described above. The output of local oscillator 30 is such that, when it is beat in mixer 20 with that output of reflex oscillator 16 which goes to mixer 20, the resultant output of mixer 20 is a series of marker pips spaced at some desired predetermined interval. It is found that 5 mc./sec. is often suitable for this work. Mixer 20 is followed by an IF strip 32 (such as disclosed on page 442 in Terman's handbook), a video amplifier 34, and by aforementioned switch 24 and oscilloscope 26. The pips appear as the 5 mc./sec. graduations shown for illustration in Fig. 2.

In operation it has been found that the frequency of the sinusoidal voltage supplied by oscillator 10 to blanker 12, to phase shifter 14, and to reflex oscillator 16 may well be 1000 c./sec. That voltage which goes to phase shifter 14 is applied to the horizontal deflection plates of oscilloscope 26, still as an undistorted sine wave.

Figure 2:
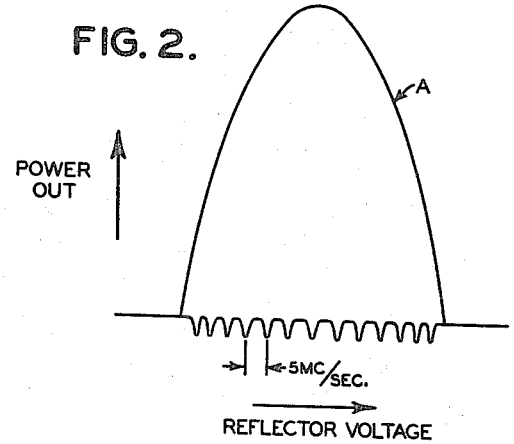

The horizontal trace in Fig. 2, therefore, becomes a plot of the alternating voltage applied to the reflector of reflex oscillator 16. The function of phase shifter 14 is merely to aid in synchronizing this voltage on the horizontal plates with the voltage, to be described subsequently, which appears on the vertical deflection plates of oscilloscope 26. Blanker 12 is a pulse shaping network which takes the sine wave from oscillator 10 and converts it into a square wave. This square wave may be used to blank out the oscilloscope pattern by biasing the cathode ray tube to nonconduction, as described below, associated with either the left-right horizontal sweep or the right-left, if this blanking effect should become necessary or desirable for clarity of observation.

As stated previously, the sinusoidally-varying voltage supplied by oscillator 10 to the reflector of reflex oscillator 16 is of such magnitude as to cause the oscillator to operate over one complete mode. The frequency of the sinusoidal voltage may have any value within wide limits, but it has been determined that 1000 c./sec. is convenient and effective. As the reflector voltage is swept from one extreme to the other, the reflex oscillator first breaks into oscillation with very little power output, next increases to put out maximum power at the point where the natural frequency of the oscillator cavity obtains, and falls off again to drop completely out of oscillation as the reflector voltage approaches the limit of its swing. This varying output is carried (in part) through detector 18, video amplifier 22 and switch 24 to appear on oscilloscope 26 as a mound-shaped plot of power output versus reflector voltage. See line A, Fig. 2.

It will be noted that the operation described furnishes a comparison of power output, rather than an obsolute measure as may be had from instrument 19. This comparison in power is desired in many instances.

In Fig. 2 the power plot A is shown as a single line. Actually it is composed of two lines superimposed, because one line is traced while the reflector voltage sweeps from maximum to minimum (and the horizontal sweep goes from left to right, for example), and the other line is traced on the reverse sweep. Fig. 2 shows no divergence between the two lines. Actually in many cases divergence will exist due to hysteresis effects within the tube. By hysteresis here is meant any effect, whether from electronic or thermal causes, which results in failure of the power plot during maximum-minimum sweep of reflector voltage to coincide with the plot associated with minimum-maximum sweep. As stated previously, it is an object of this invention to provide means for detecting and measuring the amount of this divergence, and such means exist in this graphic presentation.

When it is desired to measure frequency range of oscillation between points of half-power output there must be provided on the oscilloscope face some scale which is graduated in units of oscillation frequency. For this, consideration is directed to the series of units comprising oscillator 28, local oscillator 30, mixer 20, IF strip 32, video amplifier 34, and finally switch 24 and oscilloscope 26. Oscillator 28 provides a sinusoidally-varying voltage of frequency 5 mc./sec. to the reflector of local oscillator 30. The output of local oscillator 30 therefore consists of a fundamental frequency and discrete side bands differing in frequency from that fundamental by plus and minus an integral number of multiples of 5 mc./sec. In mixer 20 this output beats with that of the reflux oscillator under test. Whenever these two mixer inputs differ by 20 mc./sec. a signal passes through the IF amplifier, pre-tuned to 20 mc./sec. Because of the nature of the output of local oscillator 30, this results in a series of pips at 5 mc./sec. intervals. These appear on the oscilloscope as shown in Fig. 2. Inasmuch as control is provided over the vertical positioning of this plot, it is simple to adjust this positioning to facilitate measuring the frequency spread between half-power points on the power curve. Measuring instrument 19 and attenuator 19a may be used to calibrate the face of oscilloscope 26 for half power output. By means of attenuator 19a some convenient amount of power from the oscillator under test is allowed through the system and the trace thereof is given a desired maximum ordinate. Attenuator 19a is then used to reduce this power by one-half as observed on instrument 19. The consequent reduced ordinate on oscilloscope 26 will then correspond to one-half the original power. Ordinarily the vertical scale on oscilloscope 26 will be non-linear, because of the non-linearity of detector 18.

Switch 24 may be either electronic such as the well known Dumont type 185 or mechanical. Its function is merely to present alternately on the oscilloscope the power curve and the frequency markers. In speed of reversal the switch should exceed 30 reversals per second. Other individual elements of this invention are wholly conventional and require no further comment or explanation.

In the explanation, such specific figures as 20 mc./sec., 5 mc./sec., etc., are for purposes of illustration. To one skilled in the art it will be obvious that other corresponding frequencies are not thereby excluded. Also a reflex oscillator has been assumed under test, but other types of velocity-modulated oscillators may be tested without departing from the principles presented herein. The principles involved in observing frequency range between points of half power output may be used to observe frequency range between points representing any desired fraction of maximum power output.

What is claimed is:

1. Apparatus for displaying the operating characteristics of a reflex velocity modulated oscillator on a cathode ray tube comprising, an alternating voltage source, means for applying a voltage from said source to said reflex velocity modulated oscillator to vary the frequency of oscillation, a phase shifter, means for applying voltage from said source through said phase shifter to said cathode ray tube to deflect the cathode ray beam in a horizontal direction in synchronism with the variation of frequency of said reflex oscillator, a detector responsive to the output of said reflex oscillator to provide an output voltage proportional to the power output of said reflex oscillator, amplifying means for applying the output voltage of said detector to said cathode ray tube to deflect said cathode ray beam vertically, a second source of alternating current potential, a local oscillator responsive to said second source to generate a variable frequency output, a frequency converter responsive to said reflex oscillator output and to said local oscillator to produce a series of heterodyned output voltage marker signals at the occurrences of a predetermined frequency difference between said reflex oscillator and said local oscillator, and means for alternately applying said detector output voltage and said series of heterodyned output voltage marker signals to said cathode ray tube to deflect said beam vertically, whereby said cathode ray tube displays the variation of power output of said reflex oscillator with variation of frequency and frequency markers therefore.

2. Apparatus for displaying the operating characteristics of a reflex velocity modulated oscillator on a cathode ray tube comprising, an alternating voltage source, means for applying a voltage from said source to said reflex velocity modulated oscillator to vary the frequency of oscillation, a phase shifter, means for applying voltage from said source through said phase shifter to said cathode ray tube to deflect the cathode ray beam in a horizontal direction in synchronism with the variation of frequency of said reflex oscillator, a detector responsive to the output of said reflex oscillator to provide an output voltage proportional to the power output of said reflex oscillator, amplifying means for applying the output voltage of said detector to said cathode ray tube to deflect said cathode ray beam vertically, a second source of alternating current potential, a local oscillator responsive to said second source to generate a variable frequency output, a frequency converter responsive to said reflex oscillator output and to said local oscillator to produce a series of heterodyne output voltage marker signals at the occurrences of a predetermined frequency difference between said reflex oscillator and said local oscillator, means for alternately applying said detector output voltage and said series of heterodyne output voltage marked signals to said cathode ray tube to deflect said beam vertically, a pulse shaping network responsive to said first source to produce substantially a square wave output, and means to apply said square wave to bias said cathode ray tube to nonconduction during selected intervals of said oscillation, whereby said cathode ray tube displays the variation of power output of said reflex oscillator with variation of frequency and frequency markers therefore.

3. Apparatus for displaying the operating characteristics of a reflex velocity modulated oscillator on a cathode ray tube comprising, a first alternating voltage source, means for applying voltage from said source to said oscillator under test to vary the frequency thereof, means for applying voltage from said source to said cathode ray tube to deflect the beam thereof in a horizontal direction in synchronism with the variation in frequency of said oscillator under test, a detector responsive to the ouput of said oscillator to provide a voltage proportional to the power output of said oscillator, a second alternating voltage source, a local oscillator responsive to said second alternating voltage source to generate a variable frequency output, a mixer responsive to said local oscillator output and said reflex oscillator output to produce a series of output marker signals at the occurrences of a predetermined difference frequency between said local oscillator and said reflex oscillator, and a switch for alternately applying said detector output voltage and said mixer output marker signals to said cathode ray tube to deflect the beam thereof in a vertical direction, whereby said cathode ray tube displays alternately the power curve of said oscillator under test and a scale of frequency markers.

4. Apparatus for displaying the operating characteristics of a reflex velocity modulated oscillator on a cathode ray tube comprising, an audio frequency voltage source, means for applying voltage from said source to said oscillator under test to vary the frequency thereof, means for applying voltage from said source to said cathode ray tube to deflect the beam thereof in a horizontal direction in synchronism with the variation in frequency of said oscillator under test, a detector responsive to the output of said oscillator to provide a voltage proportional to the power output of said oscillator, a radio frequency voltage source, a local oscillator modulated by said radio frequency source to generate a variable frequency output, a mixer responsive to said local oscillator output and said reflex said oscillator output to produce a series of output marker signals spaced at intervals coresponding to the frequency of said radio frequency source and occurring at a predetermined difference frequency between said local oscillator and said reflex oscillator, and a switch for alternately applying said detector output voltage and said mixer output marker signals to said cathode ray tube to deflect the beam thereof in a vertical direction, whereby said cathode ray tube displays alternately the power curve of said oscillator under test and a scale of frequency markers.

References Cited in the file of this patent

UNITED STATES PATENTS

| Number | Name | Date |
| --- | --- | --- |
| 2,122,499 | Stocker | July 5, 1938 |
| 2,282,696 | Barber | May 12, 1942 |
| 2,300,999 | Williams | Nov. 3, 1942 |
| 2,337,214 | Tunick | Dec. 21, 1943 |
| 2,345,932 | Gould | Apr. 4, 1944 |
| 2,413,063 | Miller | Dec. 24, 1946 |
| 2,416,290 | Depp | Feb. 25, 1947 |
| 2,419,118 | Christaldi | Apr. 15, 1947 |
| 2,421,724 | Stewart | June 3, 1947 |